United States Patent
Davidson

(10) Patent No.: US 8,323,024 B2
(45) Date of Patent: Dec. 4, 2012

(54) SYSTEM FOR TROUBLE SHOOTING AND CONTROLLING SIGNALS TO AND FROM AN AIRCRAFT SIMULATOR

(75) Inventor: Tracy R. Davidson, Wichita Falls, TX (US)

(73) Assignee: The Boeing Company, Chicago, IL (US)

( * ) Notice: Subject to any disclaimer, the term of this patent is extended or adjusted under 35 U.S.C. 154(b) by 1126 days.

(21) Appl. No.: 11/352,605

(22) Filed: Feb. 13, 2006

(65) Prior Publication Data

US 2007/0202469 A1 Aug. 30, 2007

(51) Int. Cl.
G09B 9/02 (2006.01)

(52) U.S. Cl. ............... 434/29; 434/30; 434/365; 367/13; 367/124; 367/125; 700/3; 703/13; 703/14; 703/21; 709/208; 709/209; 709/210; 709/211; 710/260

(58) Field of Classification Search ............ 434/29, 434/365, 30; 703/13, 14, 21; 367/13, 124, 367/125; 700/3; 709/208, 209, 210, 211; 710/260
See application file for complete search history.

(56) References Cited

U.S. PATENT DOCUMENTS

| | | | | |
|---|---|---|---|---|
| 4,100,601 A * | 7/1978 | Kaufman et al. | ............... | 710/32 |
| 4,811,308 A * | 3/1989 | Michel | ........................... | 367/136 |
| 4,852,031 A * | 7/1989 | Brasington | ........................ | 703/8 |
| 5,017,141 A * | 5/1991 | Relf et al. | ........................ | 434/29 |
| 5,111,402 A * | 5/1992 | Brooks et al. | .................. | 701/35 |
| 5,262,960 A * | 11/1993 | Said et al. | ........................ | 703/18 |
| 6,046,709 A * | 4/2000 | Shelton et al. | .................. | 345/1.1 |
| 6,106,298 A * | 8/2000 | Pollak | ............................... | 434/29 |
| 6,151,567 A * | 11/2000 | Ames et al. | ...................... | 703/13 |
| 6,401,154 B1 * | 6/2002 | Chiu et al. | ...................... | 710/260 |
| 7,016,998 B2 * | 3/2006 | Mukherjee | ...................... | 710/260 |
| 7,313,511 B2 * | 12/2007 | Shahabuddin et al. | ......... | 703/19 |
| 7,343,232 B2 * | 3/2008 | Duggan et al. | .................. | 701/24 |
| 7,490,029 B2 * | 2/2009 | Wasynczuk et al. | ............. | 703/17 |
| 2002/0052725 A1 * | 5/2002 | Wasynczuk et al. | ............. | 703/22 |
| 2002/0192622 A1 * | 12/2002 | Perry et al. | ....................... | 434/16 |
| 2003/0004699 A1 * | 1/2003 | Choi et al. | ....................... | 703/14 |
| 2003/0037194 A1 * | 2/2003 | Mukherjee | ....................... | 710/260 |
| 2004/0102946 A1 * | 5/2004 | Shahabuddin et al. | ......... | 703/22 |
| 2005/0004723 A1 * | 1/2005 | Duggan et al. | .................. | 701/24 |
| 2006/0256650 A1 * | 11/2006 | Lee et al. | ......................... | 367/13 |

OTHER PUBLICATIONS

Texas Instruments, Dual Output Driver, Apr. 2001, pp. 1-8.*

* cited by examiner

*Primary Examiner* — Xuan Thai
*Assistant Examiner* — Jack Yip
(74) *Attorney, Agent, or Firm* — Weiss & Moy, P.C.

(57) ABSTRACT

A system for controlling signals coming from or going to an aircraft simulator has a first slave circuit and a second slave circuit. The second slave circuit is used to monitor signals coming from the aircraft simulator. A multiplexer circuit is coupled to the first slave circuit. The first slave circuit sends control signals to the multiplexer circuit for controlling digital output signals being sent to the aircraft simulator. A master controller is coupled to the first slave circuit and the second slave circuit. The master controller is used for controlling operation of the first and second slave circuit. A computer system is coupled to the master controller. The computer system will display a listing of the aircraft simulator signals to be controlled. Selection of a desired aircraft simulator signal by an input device of the computer system will allow one to control the selected aircraft simulator signal.

6 Claims, 5 Drawing Sheets

SYSTEM FOR TROUBLE SHOOTING AND CONTROLLING SIGNALS TO AND FROM AN AIRCRAFT SIMULATOR

BACKGROUND OF THE INVENTION

1. Field of the Invention

The present invention relates generally to an aircraft simulator, and more particularly, to a system and method for trouble shooting and controlling signals coming from or going to the aircraft simulator.

2. Background Information

Flight simulators are used to try and replicate, or simulate, the experience of flying an airplane as closely and realistically as possible. Flight simulators are extensively used by the aviation industry and the military for pilot training. Most modern flight simulators are not used so much as to train pilots on how to fly aircraft as they are to familiarize flight crews in normal and emergency operating procedures. Using simulators, pilots are able to train for situations that they are unable to safely do in actual aircraft. These situations include, but are not limited to, loss of flight surfaces and complete power loss.

There are many different types of flight simulators. Flight simulators range from the common video game that may be bought at a local electronic store to small enclosures built to replica the inside of a cockpit. More complex flight simulators include full-size cockpit replicas mounted on hydraulic (or electromechanical) actuators, controlled by state of the art computer technology.

In complex flight simulators, simulator technicians have no way of troubleshooting and temporarily fixing a faulty condition on the simulator other than a destructive action such as cutting a wire or disconnecting a cable which may impact other functions. For example, the technician has no way of temporarily fixing a faulty ejection handle switch. The simulator will be in a crashed/ejected condition and therefore will be unusable until the technician can pull the seat and fix the ejection handle switch.

Currently the troubleshooting of digital signals on flight simulators is difficult since there is not any access to the signals that allow for measurement. Technicians presently have no method of viewing/controlling signals in real time operation due to the location of the controls and where the measurements are taken.

Therefore, it would be desirable to provide a system and method that overcomes the above problems. The system and method must be able to trouble shooting and controlling signals coming from or going to the aircraft simulator.

SUMMARY OF THE INVENTION

A system for controlling signals coming from or going to an aircraft simulator has a first slave circuit and a second slave circuit. The second slave circuit is used to monitor signals coming from the aircraft simulator. A multiplexer circuit is coupled to the first slave circuit. The first slave circuit sends control signals to the multiplexer circuit for controlling digital output signals being sent to the aircraft simulator. A master controller is coupled to the first slave circuit and the second slave circuit. The master controller is used for controlling operation of the first and second slave circuit. A computer system is coupled to the master controller. The computer system will display a listing of the aircraft simulator signals to be controlled. Selection of a desired aircraft simulator signal by an input device of the computer system will allow one to control the selected aircraft simulator signal.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
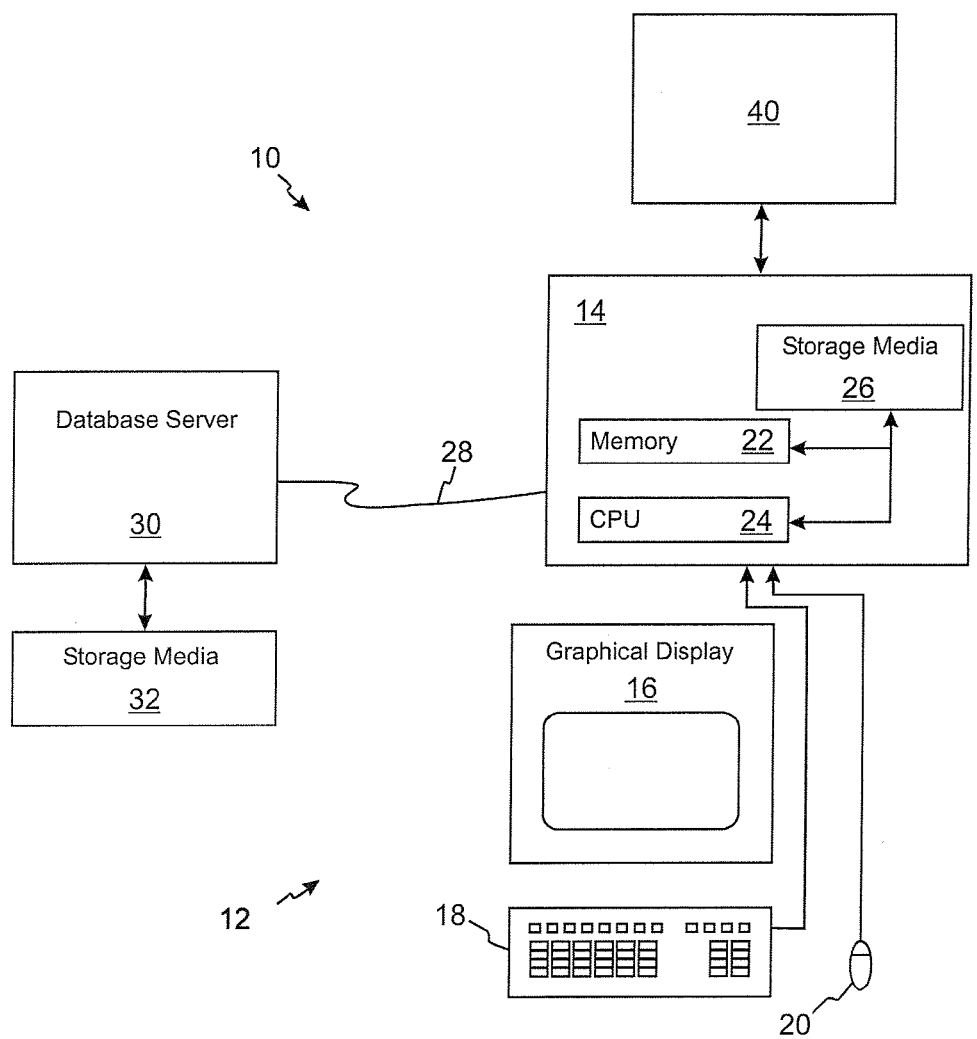
FIG. 1 is a simplified block diagram of a system for trouble shooting and controlling signals to and from an aircraft simulator.
Figure 2:
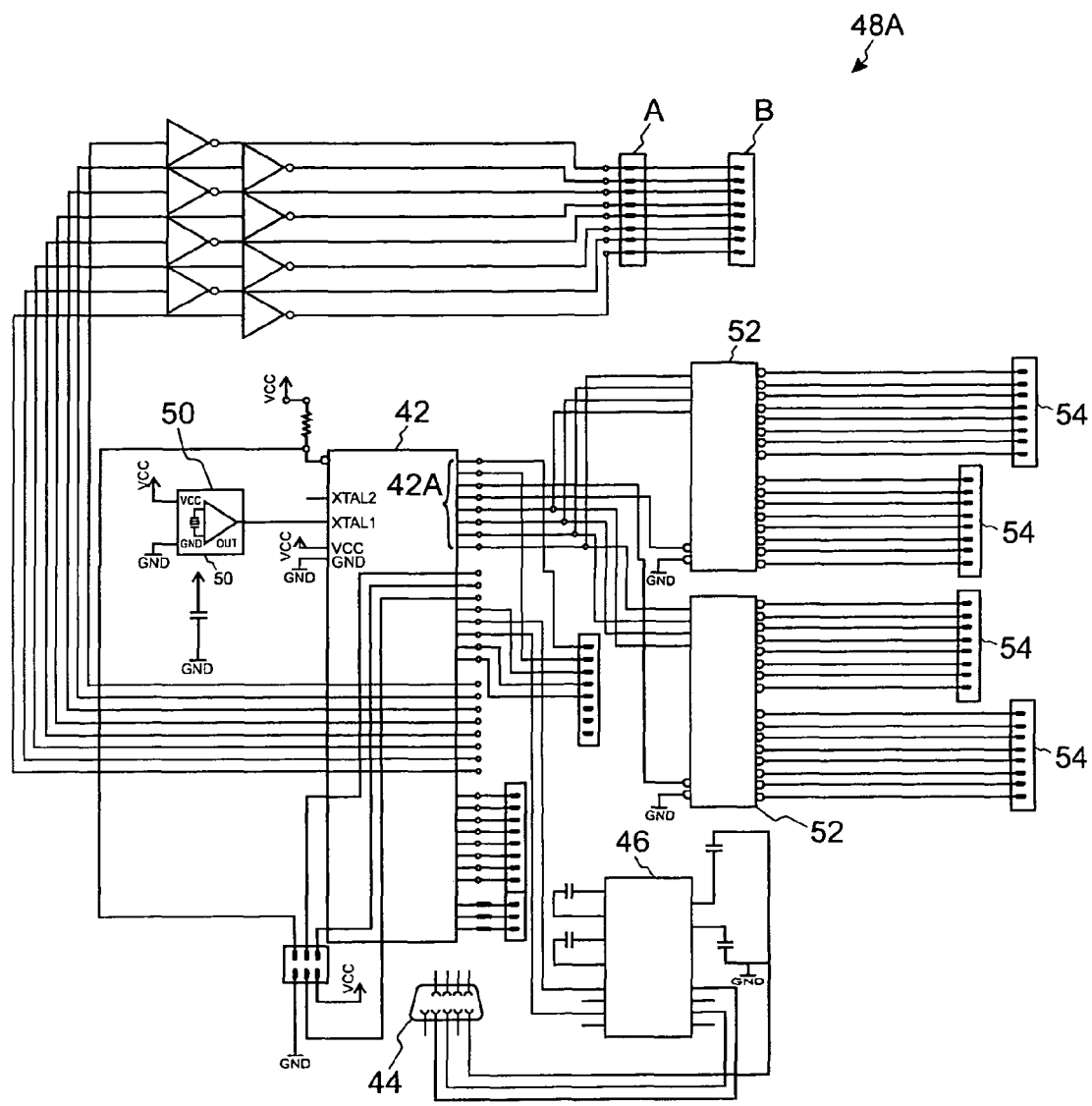
FIG. 2 is a simplified schematic of the digital output slave microprocessor schematic forming part of the present invention.
Figure 3:
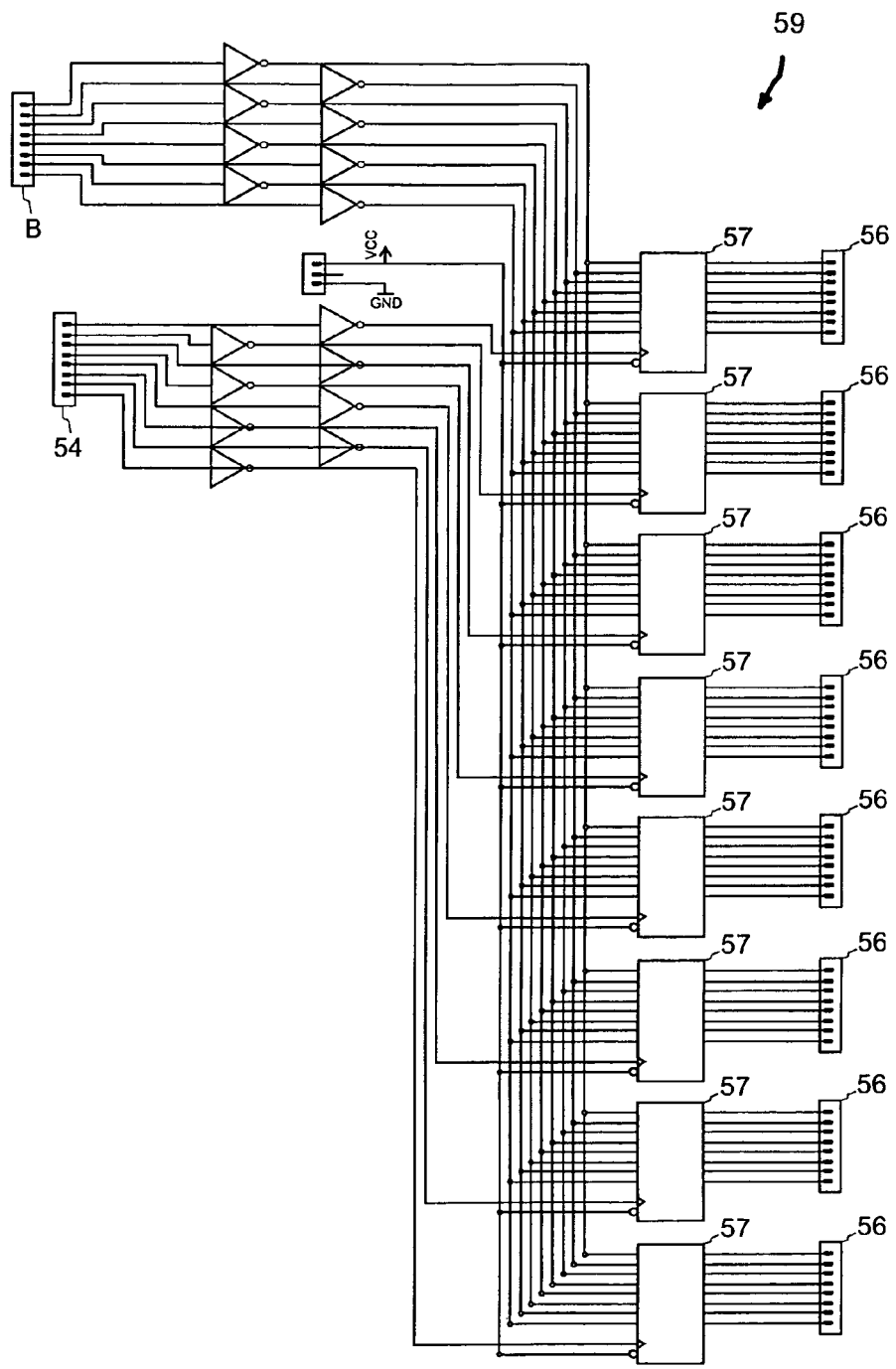
FIG. 3 is a simplified schematic of a signal control circuit forming part of the present invention.

Referring to FIG. 1, a system 10 for trouble shooting and controlling signals coming from or going to the aircraft simulator is shown. The system 10 uses a computer system 12. The computer system 12 will have a processor unit 14 and a display 16. Input devices are coupled to the processor unit. The input devices may be a keyboard 18, a mouse 20 and the like. Through the execution of program instructions forming a computer program product within the computer system 12, signals coming from or going to the aircraft simulator may be controlled through a signal control circuit 40.

The program instructions may be located within a memory 22 of the processor unit 14 and executed by a central processing unit 24 (CPU). Any data stored from the running of the program instructions such as test results and the like may be stored entirely within a storage media 26 and/or the memory 22. Alternatively, the computer system 12 may be coupled via a connection 28 to a network such as a local-area network (LAN), wide-area network (WAN) or the Internet. The connection 28 may be a wired connection, a wireless connection, or the like. In a network implementation, the program instructions may be located within a database server 30. Any data stored such as test results and the like may be stored in a storage media 32 coupled to the database server 30.

A spread sheet is stored in the memory 22 or the database server 30. The spreadsheet provides the technician an easy to view interface for controlling and viewing the digital signals. The spread sheet will list a plurality of pin numbers wherein each pin number will represent a particular signal that is to be controlled and/or monitored. By using an input device such as a key on the keyboard 18 or the mouse 20, one can enter a command to control a desired signal. Thus one can either activate or deactivate a desired signal to the aircraft simulator.

Referring now to FIGS. 1-5, a simplified functional block diagram of the signal control circuit 40 is shown. The control circuit 40 may be used to control and monitor different signals going to and form the aircraft simulator. The control circuit 40 is designed to control and view 64 or more digital inputs and outputs. The control circuit 40 has a digital output slave device 48A for sending out digital output signals to one or more digital output boards 59, a digital input slave 48B to monitor the signals coming from the aircraft simulator, and a multiplexer circuit 48C to control the signals being sent to the aircraft simulator.

The control circuit 40 has a connector 44. The connector 44 allows the control circuit 40 to be coupled to the computer system 12 in order to control and/or monitor the signals to and from the aircraft simulator. In the embodiment depicted in FIG. 2, the connector 44 is a multi-pin serial port connector. However, the serial port connector is only given as an example and should not be seen as to limit the scope of the present invention. The control circuit 40 may be coupled to the computer system 12 in different manners without departing from the spirit and scope of the present invention.

The connector 44 is coupled to a voltage converter 46. A serial port uses a different set of levels to transmit and receive with. To connect the serial port from the computer system 12 to the control circuit 40 one must convert these levels from one spec to another. The voltage converter 46 will take the RS-232 levels in from the computer system 12 and convert them to logic levels for the test circuit 40. It will also take logic levels out of the test circuit 40 and convert them to RS-232 levels for the computer system 12.

The system 10 may use different types of communication standards. In accordance with one embodiment, the system 10 uses the RS-232 communication standard which allows for data transmission from one transmitter to one receiver at data rates up to 20K bits/second and short distances up to 50 feet at the maximum data rate. The RS-232 signals are represented by voltage levels with respect to a system common (power/logic ground). The "idle" state has the signal level negative with respect to common, and the "active" state has the signal level positive with respect to common.

The system 10 may also use an RS-422 communication standard. RS-422 (was designed for greater distances and higher Baud rates than RS-232. Data rates of up to 100K bits/second and distances up to 4000 feet may be accommodated with RS422. RS-422 is also specified for multi-drop (party-line) applications where only one driver is connected to, and transmits on, a "bus" of up to 10 receivers. In order to allow RS-422 communications, the connector 44 is coupled to a differential bus transceiver. The differential bus transceiver allows for bidirectional data communication on balanced multipoint bus transmission lines. The differential bus transceiver will convert commands from the computer system 12 to the master controller 42 to RS-422 for MFD simulation.

The computer system 12 will send out signals indicating the signals which are to be controlled/monitored. The signals from the computer system are sent to a master controller 42. The master controller 42 communicates with the computer system 12 through the connector 44. The master controller 42 will process the instructions from the computer system 12 and send out signals via a plurality of pin connections. In the embodiment depicted in FIG. 2, the master controller 42 is divided in a plurality of different pin sets for sending and/or receiving data.

The master controller 42 has power and ground pins 42C. The power and ground pins are coupled to a voltage supply and ground respectively. The master controller 42 may have a reset pin. The reset pin when activated will set the master controller 42 back to a preset state. An oscillator 50 is coupled to a timing pin of the master controller 42. The oscillator 50 allows the master controller 42 to run at a predictable speed to give a meaningful timing method to the system 10.

The digital output slave device 48A has one or more demultiplexers 52 which are coupled to the master controller 42. Each demultiplexer 52 will have one or more digital output boards 59 coupled thereto. The demultiplexer 52 will take the data received from the input pins coupled to the master controller 42 and distribute the data to any or all of the output pins of the demultiplexer 52.

Each digital output driver board 59 is coupled to the digital output slave controller's demultiplexer 52 and connectors A or B from the master controller 42. In the embodiment depicted in FIG. 3, up to four digital output boards may be coupled to each digital output slave controller 54. However, this is given as an example and should not be seen as to limit the scope of the present invention. Each digital output driver board 59 is coupled to a digital output pin on the output ports 56 via a flip flop 57. The flip flop 57 is used to transfer data to the digital output board output pins 56.

Figure 4:
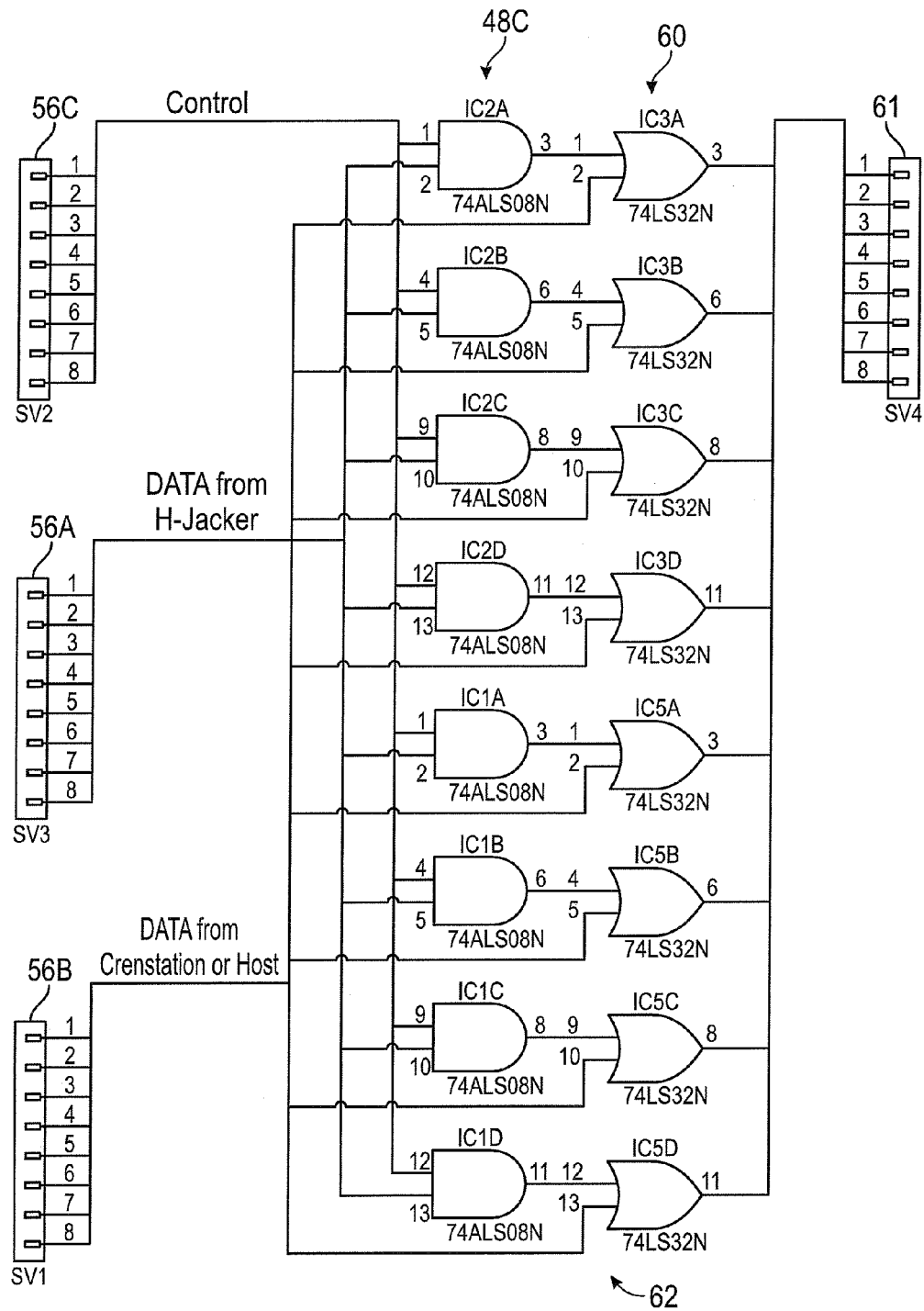
FIG. 4 is a simplified schematic of a multiplexer circuit forming part of the present invention.

Referring now to FIG. 4, a multiplexer circuit 48C used in the present invention is shown. The multiplexer circuit 48C will control the digital output signals being sent to the aircraft simulator. The multiplexer circuit 48C has a logic gate circuit 60. The logic gate circuit 60 is used to control the signals being sent to the aircraft simulator. The logic gate circuit 60 has one input 56A coupled to output pins of the cockpit. In the embodiment depicted in FIG. 4, input 56A is coupled to eight output pins of the cockpit. However, this should not be seen as to limit the scope of the present invention. Inputs 56B and 56C of the logic gate circuit 60 are coupled to the pins of two different digital output boards 56. The output 61 of the logic gate circuit 60 is coupled to the other side of the interrupted connection to the simulator computer system that was connected to 56A. The logic level on 42B will determine if the signal from the cockpit 56A is interrupted. If the signal is interrupted then the signal on 56B will be output to the simulator computer system at the logic level determined by the technician.

In the embodiment depicted in FIG. 4, the logic gate circuit 60 has eight sets of AND and NOR gates 62. It should be noted that eight sets are given as an example and should not be seen as to limit the scope of the present invention. Each set of AND and NOR gates 62 are coupled together such that the output of the AND gate is coupled to a first input of the NOR gate. One input of each AND gate is coupled to a pin 56 of the digital output board 59 which is used to transmit data. A second input of each AND gate is coupled to the output pins of the cockpit. A second input to each NOR gate is coupled to the pins 56 of another digital output board 59. The output of the NOR gate is coupled to the simulator computer system.

Figure 5:
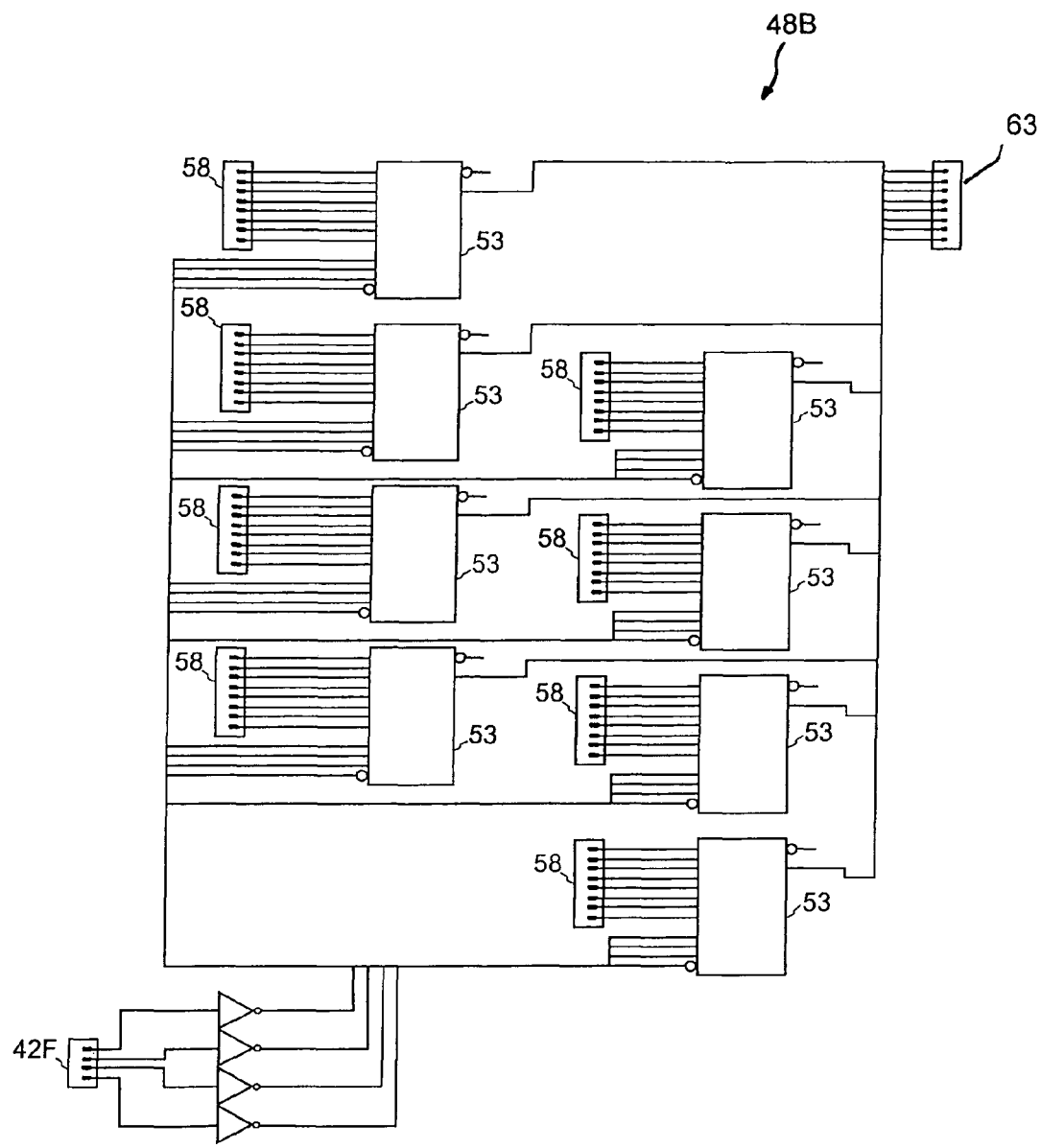
FIG. 5 is a simplified schematic of a digital input slave device forming part of the present invention.

In order to monitor the signals, a digital input slave 48B is used. Referring to FIG. 5, the digital input slave device 48B will have a plurality of multiplexers 53. Each multiplexer 53 will be coupled to a set of I/O pins 42F of the master controller 42. Each multiplexer 53 will further be coupled to one of the second set of pins 42B of the master controller 42. In the embodiment depicted in FIG. 5, the digital input slave device 48B has eight multiplexer 53 and 64 digital inputs 58. However, this is only given as an example and should not be seen as to limit the scope of the present invention. The digital inputs 58 can be used to monitor signals coming from the cockpit of the aircraft simulator.

Referring now to FIGS. 1-5, in operation, a user will input a command on the spreadsheet via an input device such as a key on the keyboard 18 or the mouse 20. The command can be to activate or deactivate a desired signal to the aircraft simulator. The command will send a signal to the master controller 42. The master controller 42 will send out a control signal via the pin sets 42A and 42B. The first set of pins 42A will send control signals to the demultiplexer 52 of the digital output slave device 48A. The demultiplexer 52 will send signals to one or more digital output boards 59 coupled thereto. Two digital output board outputs 56 are coupled to two inputs of each multiplexer circuit 48C. A third input of the multiplexer circuit 48C is coupled to the cockpit output pins. The output 63 of the multiplexer circuit 48C is connected to the simulator computer system. The connections to the multiplexer circuit 48C will allow one to control the digital output signals being sent between the cockpit and the aircraft simulator computer system.

In order to monitor the signals, a digital input slave 48B is used. The digital input slave device 48B will have a plurality of multiplexers 53. Each multiplexer 53 will be coupled to a set of I/O pins of the master controller 42. Each multiplexer 53 will further be coupled to one of the second set of pins 42B of the master controller 42. Each multiplexer 53 will also be coupled to the digital outputs of the cockpit of the simulator. The digital input board 58 can be used to monitor signals coming from the cockpit of the aircraft simulator.

The system 10 provides an aircraft simulator technician with a device that allows additional troubleshooting capabilities and allows the technician to select any signal(s) coming from or going to the cockpit of the aircraft simulator and gives the technician the ability to change the signals values. This provides an undestructive temporary fix, thus allowing the aircraft simulator to be used in a degraded status until time allows for permanent repair, and allows faster troubleshooting. The system 10 is simply plugged in to the cockpit of the aircraft simulator. The technician, using the software, views all the signals coming or going to the aircraft simulator and overrides the signals required.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A system for controlling signals coming from or going to an aircraft simulator comprising:
    a first slave circuit, wherein the first slave circuit is a digital output slave device;
    a second slave circuit to monitor signals coming from the aircraft simulator during testing, wherein the second slave device is a digital input slave circuit;
    a multiplexer circuit;
    a master controller coupled to the first slave circuit and the second slave circuit for controlling operation of the first and second slave circuit; and
    a computer system coupled to the master controller and to an output of the multiplexer circuit, the computer system displaying a listing pin numbers wherein each pin number is a specific aircraft simulator signal to be controlled, wherein selection of a desired aircraft simulator signal by an input device of the computer system allowing one to control the selected aircraft simulator signal sent to the aircraft simulator and a value of the selected aircraft signal;
    wherein the digital output slave device comprising:
        at least one demultiplexer coupled to the master controller;
        at least one digital output slave controller coupled to the demultiplexer; and
        at least one digital output driver board coupled to an output of the demultiplexer and the master controller, wherein each digital output driver board comprises:
            a plurality of flip flops, wherein each flip flop is coupled to the digital output slave controller and to the master controller; and
            a plurality of output ports, wherein an individual output port is coupled to each of the plurality of flip flops, wherein at least one output port is attached to a desired component of the aircraft simulator to be tested to send the selected aircraft simulator signal to the desired component of the aircraft simulator;
    wherein the multiplexer circuit has a first input attached to a first output port, a second input attached to a second output port, a third input attached to output pins of the aircraft simulator, and an output of the multiplexer circuit attached to the computer system, the multiplexer circuit allowing one to control the digital output signals to send a specified digital output signal at a specified value to any specific pin on the aircraft simulator based on selection of the desired aircraft simulator signal by the input device of the computer system the multiplexer circuit sending a corresponding response signal based on the desired aircraft simulator signal selected from the aircraft simulator to the master controller, wherein the specified value of the desired aircraft simulator signal selected is adjusted via the computer system so the multiplexer circuit sends the corresponding response signal at a desired level;
    wherein the digital input slave device comprises:
        at least one digital input slave multiplexer having inputs coupled to the master controller and outputs coupled to the computer system; and
        a digital input board coupled to an output each of the at least one digital input slave multiplexer, wherein the digital input board is coupled to the aircraft simulator to monitor signals from the aircraft simulator based on the specified digital output signal sent to the aircraft simulator.

2. The system for controlling signals coming from or going to an aircraft simulator in accordance with claim 1 wherein the multiplexer circuit comprises a logic gate circuit having a first set of inputs attached to the output pins of the aircraft simulator, a second set of inputs attached to the first output port of the first slave circuit, and a third set of inputs attached to the second output port of the first slave circuit.

3. The system for controlling signals coming from or going to an aircraft simulator in accordance with claim 2 wherein the logic gate circuit comprises a plurality of AND - NOR gate pairs.

4. The system for controlling signals coming from or going to an aircraft simulator in accordance with claim 3 wherein each AND—NOR gate pair comprises:
    an AND gate having an AND gate first input coupled to the output pins of the aircraft simulator and an AND gate second input coupled to the first output port of the first slave circuit; and
    a NOR gate having a NOR gate first input coupled to an AND gate output and a NOR gate second input coupled to the second output port of the first slave circuit.

5. The system for controlling signals coming from or going to an aircraft simulator in accordance with claim 1, wherein the computer system comprises:
    a processing unit for storing the listing of the aircraft simulator signals to be controlled, wherein selection of a desired aircraft simulator signal sends a control signal to allow one to control the selected aircraft simulator signal;
a display coupled to the processing unit for showing the listing of the aircraft simulator signals to be controlled; and
an I/O device coupled to the processing unit for selecting the desired aircraft simulator signal.

6. The system for controlling signals coming from or going to an aircraft simulator in accordance with claim 1, further comprising a voltage converter coupled to the master controller and the computer system for converting a control signal from the computer to a proper logic level.

* * * * *